Dec. 22, 1959   J. SWARBRICK   2,917,854
DISPLAY DEVICE

Filed Jan. 12, 1956   2 Sheets-Sheet 1

INVENTOR.
John Swarbrick
BY
Attÿ.

Dec. 22, 1959  J. SWARBRICK  2,917,854
DISPLAY DEVICE

Filed Jan. 12, 1956  2 Sheets-Sheet 2

INVENTOR.
John Swarbrick
BY
Att'y.

United States Patent Office 2,917,854
Patented Dec. 22, 1959

2,917,854

DISPLAY DEVICE

John Swarbrick, Nokomis, Ill.

Application January 12, 1956, Serial No. 558,766

6 Claims. (Cl. 40—137)

This application is a continuation-in-part of application Serial No. 449,086 filed August 11, 1954 now abandoned.

The invention relates to improvements in attention getting display signs or devices and is particularly related to a display presenting, in addition to any advertising matter or pictorial representation thereon, a design pattern which has apparent movement upon relative movement of the observer and/or either or both of the two panels constituting the sign.

More particularly, the present invention relates to a display device embodying a novel combination of groups of lines and a novel arrangement of the lines in each group arranged on related sheet members or panels so as to present to the observer continuously moving dark moires, preferably arranged in a checker-board pattern.

The visual checker-board pattern obtained while observing this display preferably consists of clearly defined dark areas or moires of predetermined size, offset or staggered with respect to each other, and which have the appearance of moving in one or more directions. The apparent rate and direction of movement of the moires are controlled by the relative number of lines on the front panel and the lines on the back panel; the spacing between the front panel and back panel; the distance from the display to the observer; the angular disposition of the lines; and the speed of the relative movement of the point of observation and one or both of the panels. It is therefore an object of the invention to provide a display device with a visual checker-board pattern composed of a plurality of moires having various speeds of movement in either one of two directions.

Another object is to provide a display device of the character referred to which is relatively simple and economical to manufacture, and which is substantially as effective under normal daylight conditions as when artificially illuminated.

Another object is to provide a display device having thereon a series of moires of uniform density and which are generated by groups of relatively-thin uniformly-spaced lines of uniform width on one panel which cooperate with relatively-thin lines of uniform width on a second panel and wherein the lines in some of the groups are inclined in one direction while the lines in other groups are inclined in another direction, whereas the lines in still other groups are substantially parallel to the lines on the related panel, so as to impart to an observer movement of said moires in different directions when the positions of the lines on one panel are changed relative to the positions of the lines on the other panel and to said point of observation.

An important feature of the present invention resides in the arrangement whereby different directions of moire movement are obtained in different respective areas of the sign by varying the line spacing and inclination of the lines on one of the panels, rather than by varying the thickness of the lines.

Although in the particular preferred embodiment of the invention disclosed herein, the panels are fixed and the moire movement is provided only when the observer moves while watching the sign, it will be understood that any suitable means may be employed to move one or both of the panels so as to provide movement of the moires even though the observer remains stationary.

Another extremely important aspect of the present invention resides in the arrangement for obtaining the staggered or offset relationship of the moires so as to provide the desired checker-board pattern. It has been discovered that if the lines on one panel are apparently moved a distance of one line space (measured from center-line to center-line of the lines) relative to the other panel, the moires or dark areas will move a distance equal to one moire space. That is, each moire will move so as to occupy the position formerly held by the preceding adjacent moire in the series. It will thus be seen that if a particular group of lines is displaced a distance equal to one-half the line spacing, then the moire formed by that group will be displaced a distance equal to one-half the moire spacing. Applying this discovery to the present invention, the disclosed display sign embodying the invention comprises four rows of groups of lines, the rows being arranged in rectangular fashion around the periphery of the sign and encircling a central rectangular area which may contain any suitable advertising matter or pictorial representation. Each of the two horizonal rows comprises a pluraliy of groups of lines and the lines of each group are offset a distance of one-half line spacing, measured center-line to center-line, with respect to the lines of the two adjacent groups on opposite sides thereof. That is, the line at the extreme end of one group is spaced from the adjacent line at the extreme end of an adjacent group a distance, measured center-line to center-line, equal to one and one-half times the normal line spacing of the lines in each group. Since the lines in each group are offset a distance equal to one-half the normal line spacing with respect to the lines in the two adjacent groups, it will be seen that the moire or dark area formed in each group is staggered or offset a distance equal to one-half moire space with respect to the adjacent moires formed in the adjacent groups, thereby providing the desired checker-board pattern. The groups constituting the two vertical rows are also offset in the horizontal direction an amount equal to one-half the center-to-center spacing between the lines within each group.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings.

The display device illustrated in Figs. 1, 2, 3 and 4 includes a transparent sheet 11 (Fig. 1) hereinafter referred to as the "second sheet," having a series of critically positioned groups of fine lines 12, 13, 14 and 15, preferably opaque, arranged in such fashion as to present a border effect surrounding an unlined central rectangle 16 although it should be obvious that the pattern disclosed is but representative of numerous patterns that may be developed using the characteristics described hereinafter. This second sheet 11 is positioned in front of a transparent, thanslucent or opaque "first" panel or sheet 17 having overall parallel uniformly spaced apart vertical lines 18 on its face disposed towards the second sheet 11.

When the second sheet 11, having the groups of lines thereon, is positioned in front of the first sheet 17, an observer moving in front of the display will have the visual impression of a staggered or checker-board pattern of dark areas or moires moving in different directions. This pattern and apparent movement result from the spacing and angular disposition of the lines in the various groups of lines on the second sheet relative to the spacing of the lines on the first sheet. This apparent movement and checker-board pattern is occasioned when projections of the opaque lines on the first sheet become visible to an observer through the spaces between the lines and groups of lines on the second sheet, which movement is consistently in a predetermined direction dependent upon the direction of movement of the point of observation. In the present disclosure the width of the lines and the width of the spaces between the lines on both sheets are such as to make it desirable, but not essential, to locate the first sheet 2⅝ inches in back of the second sheet when it is intended that the point of observation be about 10 feet in front of the display. This sheet spacing will insure the most desirable results although other spacings may be utilized without materially affecting the display.

It is to be understood that the visual effect of moving moires is obtained by relative displacement of the two panels with respect to the point of observation. That is, the effect can be obtained either by movement of the observer in a direction transversely of the sign (in a direction having a vector component parallel to the planes of the panels), or by movement of one or both of the panels as the observer remains stationary, or even as the observer moves. It is merely essential that there be some relative movement of any one of the three elements: the first panel, the second panel, or the point of observation.

Figure 1:
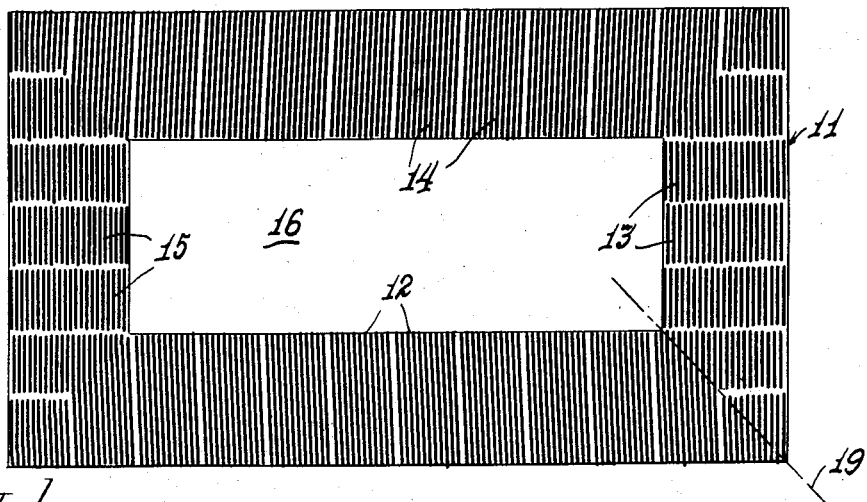
Fig. 1 is a front elevational view of the front panel or sheet of the improved display device.
Figure 4:
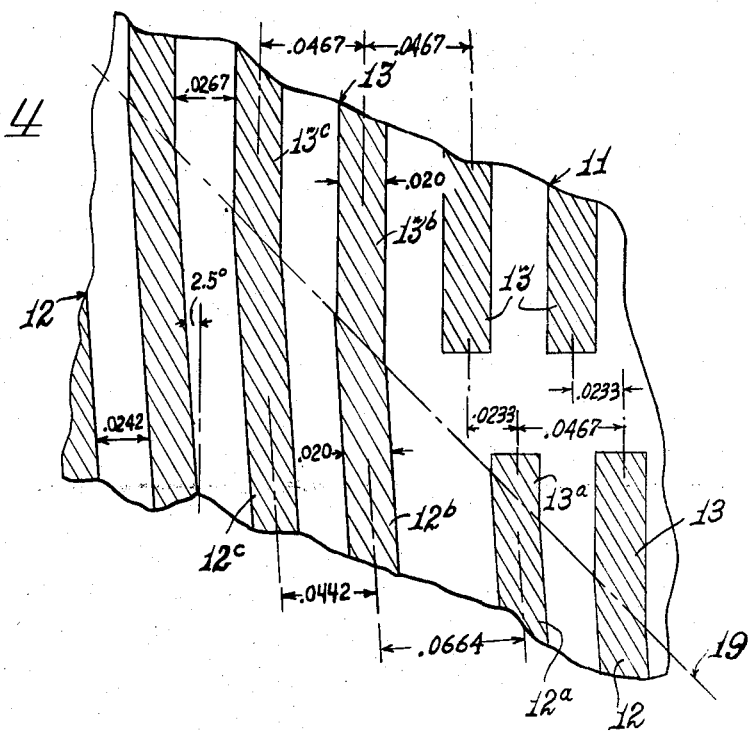
Fig. 4 is a schematic view illustrating the line arrangement at one corner of the display.

Referring now to the specific disclosure of the front or second panel shown in Fig. 1, the groups of lines designated by the reference numeral 12 are arranged in a row along the bottom margin of the front panel 11. Each of the groups 12 comprises a series of relatively thin parallel lines uniformly spaced with respect to each other and having a "pitch" of 22.6 lines per inch measured in the direction perpendicular to the lengths of the lines. This pitch or spacing results in the lines being spaced apart approximately .0442 inch from center-line to center-line, as shown in Fig. 4. Although the exact thickness of the lines is not absolutely critical, it is indispensible to the practice of the present invention that the lines be relatively thin in order to provide moires of the proper density. That is, if the lines are too thick the moires will be so dense and blurred as to lack proper clarity and definition when viewed by the observer. However, the thickness of the lines does not affect the moire pattern or the movement of the moires for a given center-to-center spacing of the lines. It has been found preferable, in order to obtain moires having the greatest clarity and definition, to make the lines approximately equal to three-fourths as thick or wide as the blank spaces between the lines. Given the center-line to center-line spacing of the lines and the ratio of the thickness of the lines to the thickness of the blank spaces, the various dimensions can be readily determined. In order to obtain the approximate dimension of the line thickness, it is merely necessary to multiply the center-line to center-line distance by three-sevenths (3/7), and the width of the blank spaces between the lines can be determined by multiplying the center-line to center-line distance of the lines by four-sevenths (4/7).

In the case of the lines of groups 12, which lines are spaced apart .0442 inch center-line to center-line, if the thickness or width of each line were .0189 inch (that is, .0442 multiplied 3/7 and the width of the clear spaces between the lines were .0253 inch (.0442 multiplied by 4/7) then the ¾ ratio would be provided exactly. However, in order to provide that all of the lines on panel 11 be of a uniform thickness even though the line spacing varies in the various groups, the thickness of all of the lines, including those of groups 12, is preferably approximately .020 inch. Having determined the center-line to center-line distance as .0442 inch and the thickness of the line as .020 inch, it will then be obvious that the width of the blank spaces between the lines of group 12 is approximately .0242 inch (.0442 minus .020). The lines of groups 12 are parallel and are inclined upwardly to the left 2.5 degrees.

In order to provide the staggered checker-board moire pattern, the lines of each of the groups 12 are offset, with respect to the lines of the two adjacent groups on opposite sides thereof, a distance equal to one-half the center-line to center-line distance between the lines of each group. More particularly, and referring to Fig. 4, the reference numeral 12$^a$ indicates a line at the extreme end of one of the groups 12 and the reference numeral 12$^b$ refers to a line at the extreme end of an adjacent group 12. Instead of the center-line to center-line spacing distance between lines 12$^a$ and 12$^b$ being .0442, this distance is increased by ½ and is approximately .0664 inch (.0442 multiplied by 1.5). In other words, line 12$^a$, as well as all the other lines in its group, are offset with respect to the group of lines including line 12$^b$ a distance equal to one-half the normal line spacing. It is to be understood that the terms "distance," "line spacing," and similar terms, are used throughout this specification and claims to refer to the center-line to center-line distance between the lines rather than the edge-to-edge distance; that is, the distance from the center of one line to the center of the adjacent line, measured in a direction perpendicular to the lines.

Referring again to Fig. 1, the reference numeral 14 indicates a plurality of groups of lines arranged in a row across the top margin of the configuration on panel 11. The lines of groups 14 are spaced at a pitch of approximately 22.6 lines per inch and thus have a center-line to center-line spacing of .0442 inch, the same as the lines of groups 12. However, the lines of the groups 14 are inclined about 2.5 degrees upwardly to the right. Otherwise, the spacing and arrangement of the groups 14 are the same as those noted above with respect to the groups 12.

The reference numeral 13 indicates groups of lines arranged in a vertical row along the right-hand margin of the design configuration on the panel 11. The lines of the groups 13 are vertical rather than inclined and are spaced with a pitch of approximately 21.4 lines per inch. This pitch provides a line spacing of approximately .0467 inch (center-line to center-line). Since the lines of groups 13 are .020 inch in thickness, in order to provide uniformity of line thickness throughout, the width of the spaces between these lines is approximately .0267 inch, as shown in Fig. 4.

It will be seen that the groups 13 are arranged one above the other. As best shown in Fig. 4 the lines of each group are horizontally offset or staggered with respect to the lines of the adjacent groups immediately above and below a distance equal to one-half the line spacing, that is, approximately .0233 inch (.0467 multiplied by .5).

The line groups 15 are arranged in a vertical row along the left-hand margin of the design configuration of panel 11. These lines are vertical and are spaced apart with a pitch of approximately 23.6 lines per inch so as to provide a center-line to center-line spacing of .0424 inch. These lines also are approximately .020 inch wide thus leaving a clear space of about .0224 inch in width between each of the lines of groups 15. These groups are horizontally offset or staggered an amount equal to one-half the line spacing (.0424 multiplied by .5) in the same manner as groups 13.

It will be understood that the lines of each of the groups 13, 14, and 15 are offset, with respect to the lines in the adjacent groups of the same row, a distance equal to one-half the center-line to center-line spacing between the lines of that particular row, in the same manner as described above with respect to the groups 12.

Where the rows of groups of lines meet at the corners of the rectangular pattern illustrated, the lines of the adjacent groups at said corners merge on a 45 degree line as indicated by the broken line 19. This merger of the lines is effected without any perceptible break in the continuity of the lines of the adjacent merging groups. This is an extremely important feature of the present invention in that it provides for the formation of continuous integral moires having continuous flowing movements in the corner area, rather than fragmentary moires and discontinuous movements which would occur if the line spacing and angular orientation of the lines in the various groups 12 to 15 were not selected and related to each other in such a way to provide an alignment along the diagonal broken line 19 of the lines of one group with the lines of an adjacent group in the adjacent row. For example, it will be seen in Fig. 4 that the line 12$^a$ is in alignment with line 13$^a$, line 12$^b$ is in alignment with line 13$^b$, line 12$^c$ in alignment with line 13$^c$, etc. This coincidence or alignment is provided, notwithstanding the fact that the lines of groups 13 are spaced wider apart than the lines of groups 12, by virtue of the 2½ degree difference in angular inclination of the lines of groups 12 with respect to the lines of groups 13. The central rectangular area 16 of the pattern may be left clear or it may be utilized to bear any desired advertising or other display material.

Figure 2:
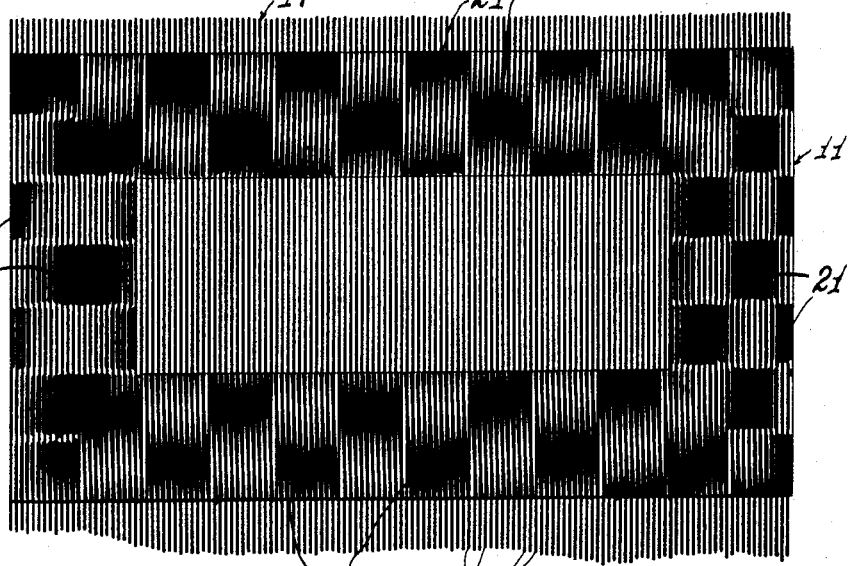
Fig. 2 is a view showing the display device as viewed by an observer, the panel or sheet of Fig. 1 being shown in place in front of a lined back panel or sheet, said back panel or sheet being extended for purposes of this illustration only beyond the top and bottom margins of the front sheet.

The first or rear panel 17, which is shown in Fig. 2 behind the front panel 11 and is extended beyond the top and bottom edges of the latter for purposes of illustration, has an overall pattern of parallel vertical lines spaced with a pitch of 22 lines per inch, thereby providing a center-line to center-line spacing of approximately .0454 inch. The lines on the rear panel 17 are preferably of the same uniform width of .020 inch as the lines on the front panel 11, although this is not indispensible.

Figure 3:
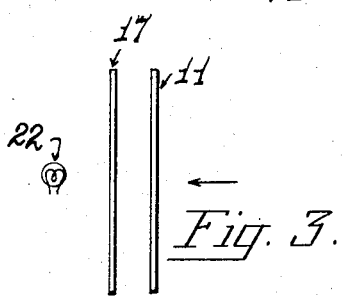
Fig. 3 is a schematic view illustrating the relative spacing between the front and back sheets.

When the two sheets are positioned as previously described with the second sheet 11 in front of the first sheet 12, an observer, viewing the display in the direction of the arrow in Fig. 3 and changing his point of vision as he moves to the right, as viewed in Fig. 2, transversely of the line of vision, will observe dark areas or moires 21 moving outwardly in each of the groups of lines 12, 13, 14 and 15. This apparent movement is due to the changes in the relative positions of the light and dark areas or moires as the observer moves relative to the display resulting from the progressive cutting-off and exposure of the parallel lines on the first sheet 17 by the lines in the groups of lines on the second sheet 11. More specifically, the moire patterns appearing in the groups 12 in the present illustration will move downwardly. Those in groups 14 will appear to move upwardly and those in groups 13 and 15 will appear to move respectively to the right and left. Should the observer move to the left as the display is viewed in Fig. 2, the moires will flow inwardly on each group toward the central area 16. Also, owing to the merger of the groups of lines at the ends of the rows of groups, the moires generated therein will merge one with the other so that as the moires advance either inwardly or outwardly the moires appearing thereon will be in substantial register one with the other and present the appearance of a single moire fanning out or contracting, dependent upon the direction of movement of the point of observation. There is thus, a smooth continuous unbroken movement of moires inwardly or outwardly throughout the entire perimeter of the pattern illustrated.

The speed with which the moires move depends upon the number of lines in each group and further upon the rate of speed at which the point of observation advances past the front of the display. Because each group of lines is made up of a considerable number of fine lines closely spaced together each moire will assume the appearance of a square or rectangle moving longitudinally of its generating lines (groups 12 and 14) or perpendicular to the lines (groups 13 and 15). Owing to the space or gap between adjacent groups of lines in the rows of groups 12 and 14 and the staggering of the lines of adjacent groups in the rows of groups 13 and 15, the moires on adjacent groups, other than at the corners, are offset or staggered one-half of their normal spacing. This gives rise to a checkerboard effect which is apparent to the observer and is illustrated in Fig. 2. Obviously, the lines on the first sheet may be non-parallel or spaced in groups while the lines on the second sheet could be without grouping, or the first sheet 17 could be transparent and placed in front of the sheet 11 in which event the staggering of the moires would be effected substantially as has been described. When both sheets 11 and 17 are transparent, a source of illumination 22 (Fig. 3) can be arranged at the rear of the sheets.

Figure 5:
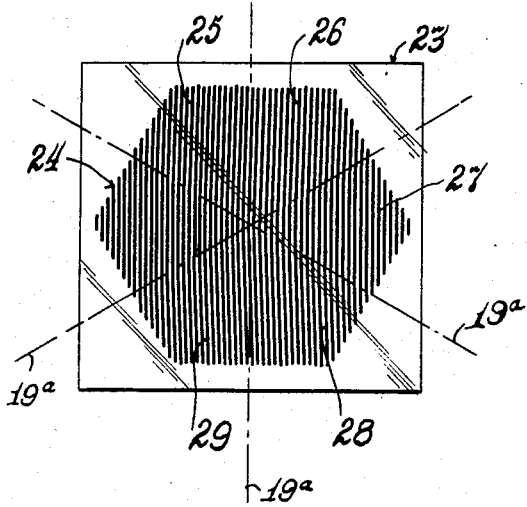
Fig. 5 illustrates a panel or sheet comprising a part of a modified form of display, having a hexagon pattern thereon defined by a multiplicity of groups of lines.
Figure 6:
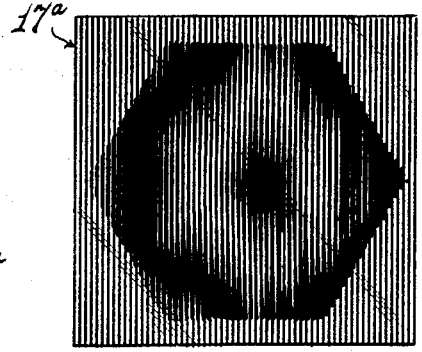
Fig. 6 is a front elevational view illustrating the moires produced when the panel or sheet of Fig. 5 is associated with a lined back panel.

Figs. 5 and 6 are representative of another arrangement of lines on a "second" sheet associated with a "first" sheet having an overall pattern of uniformly spaced apart parallel lines thereon. For purposes of description, the parallel lines on the first sheet 17a are like those on sheet 17 described hereinabove. The complemental or second sheet 23 has a series of vertical and inclined lines novelly arranged in groups disposed in the pattern of a hexagon. The hexagon illustrated is composed of six line groups 24, 25, 26, 27, 28 and 29, each containing a number of fine lines per inch differing from those in an adjacent group and on the first panel. A series of six radial dash-dot lines 19$^a$ is shown in the drawing to indicate and demarcate the various groups, it being understood that lines 19$^a$ are merely for purpose of illustration and do not exist in an actual embodiment of the sign. With a display of this character there are obtained hexagonal moire patterns which move radially outwardly or inwardly with respect to the center of the display, depending upon the direction of relative movement of the observer or the moving panel or panels. This uniform movement of the moire generated in each group of lines arises from the critical positioning of the lines in each of said groups. In the present disclosure the line group 24 has 23.6 lines per inch arranged vertically; the line group 25 has 23 lines per inch arranged parallel to each other and inclined 1.75° to the right. The group of lines 26 is composed of lines arranged 21.8 lines per inch which are parallel to each other and are inclined substantially 1.75° to the right. The line group 27 has vertical lines arranged 21.4 lines per inch while the group 28 has 21.8 lines per inch inclined to the left 1.75° and the group 29 has 23 lines per inch inclined 1.75° to the left. In this hexagon pattern also, the vertical lines of groups 24 and 27 join the inclined lines of the adjacent sections without any noticeable break in the line structure, thus giving rise to a display wherein the moire pattern has continuity in a substantially hexagonal band, the band increasing or decreasing in its perimeter depending up the direction of movement of the point of observation or of the moving panel or panels.

It should be understood that the present disclosure is more or less schematic so as to best illustrate the structure, purposes and operation of each display. In practice, the sheets containing the lines may be enclosed within a box or frame and, for example, the sheet bearing the lined hexagonal representation in Fig. 5 may be the same size and shape as its complemental sheet 17a. Any areas not occupied by the lined pattern may be wholly or partially transparent or opaque and if desired additional display material may be carried in such areas. It might be noted also that although the first or rear sheet or panel in each of the specific disclosures herein has lines spaced 22 lines per inch it has been necessary, for purposes of the present illustrations of the moires, to illustrate these lines as being spaced about 22.5 lines per inch in order to correct for the lack of perspective effect in the drawings. This is because in the moire disclosures herein there is no actual depth or spacing between the front or back panels, one having been superimposed upon the other in the same plane so as to present the overall picture of the display whereas in practice the panels are actually spaced apart 2⅝ inches as stated hereinabove.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. A display device comprising a pair of parallel spaced panels arranged one in front of the other, a first of said panels having a series of parallel uniformly spaced lines of uniform thickness extending in a predetermined direction thereon, the other panel having thereon a plurality of line groups arranged in rows, the lines in all of said groups being of uniform thickness, the lines constituting the groups in a first of said rows being parallel to each other and to the lines on said first panel, there being a greater number of lines per inch in the groups of said first row than there are on said first panel, the lines constituting the groups in a second of said rows being parallel to each other and inclined in one direction relative to the lines on the said first panel, there being a greater number of lines per inch in the groups of said second row than there are on the said first panel but fewer than there are in said first row; the lines constituting the groups in a third of said rows being parallel to each other and to the lines on the first panel, there being fewer lines per inch in the groups of said third row than there are on said first panel, and the lines constituting the groups in a fourth of said rows being parallel to each other and inclined in a direction opposite to the direction of inclination of the lines in the groups of the second row, there being the same number of lines per inch in the groups of said fourth row as in said second row, the lines of each group being offset with respect to the lines of the groups adjacent thereto a distance equal to one-half the center-to-center distance between the adjacent lines of the same group, the optical projection of the lines on one of said panels toward a point of observation in front of the display intersecting the lines on the other panel to form therewith a checker-board pattern of moires.

2. A display device as recited in claim 1 wherein said rows are arranged in the form of a rectangle, each extreme portion of each row being adjacent to and adjoining along a diagonal junction a respective one of the extreme portions of two other rows, each of the lines in the extreme portions of each row being in substantial alignment with and merging with a respective one of the lines of the adjacent extreme portion of another row, whereby the moires formed in said extreme portions extend continuously and integrally across said diagonal junction from one row to the row adjacent thereto.

3. A display sign comprising a pair of mutually spaced parallel panels, one of said panels having a first series of spaced parallel lines over a substantial area thereof, the other of said panels having a second series of spaced parallel lines, a first of said panels being located between the second panel and a point of observation of the sign, said first panel having transparent spaces between the lines thereof to permit light rays from the second panel to be transmitted through said transparent spaces to said point of observation, the optical projections of the lines of said second panel to said point of observation intersecting the lines on the first panel to provide a plurality of dark moires in spaced relation to each other, said second series of lines being arranged in a plurality of contiguous groups extending in side-by-side relation, the lines of each of said groups being offset with respect to the lines of the groups adjacent thereto a distance equal to one-half the center-to-center distance between the adjacent lines of the same group, whereby the moires appearing in each group will be in alignment with the spaces between the moires in the groups adjacent thereto so as to provide a staggered checkerboard pattern of moires.

4. A display sign as recited in claim 3 wherein said second series of lines extends over a plurality of contiguous areas, each of said areas having two opposite end portions, the end portions of each of said areas being adjacent to and adjoining the respective end portions of two other areas along a junction line, said areas extending in continuous end-to-end relation to each other, each of the lines in the end portions of each area being in alignment with and merging with a respective one of the lines of the adjacent end portion of another of said areas, whereby the moires formed in said end portions extend continuously and integrally across said junction line from one area to the areas adjacent thereto.

5. A display device comprising a pair of spaced parallel panels, a first of said panels having a series of parallel uniformly spaced lines of uniform thickness extending in a predetermined direction thereon, the other panel having thereon a plurality of lines arranged in four rows, the lines in all of said rows being of uniform thickness, the lines in a first one of said rows being parallel to each other and to the lines on said first panel, the lines of said first row having a smaller pitch than the lines on said first panel, the lines in said second row being parallel to each other and inclined in one direction relative to the lines on said first panel, the lines in said second row having a smaller pitch than the lines on said first panel and a greater pitch than the lines in said first row, the lines in a third of said rows being parallel to each other and to the lines on said first panel, the lines in said third row having a greater pitch than the lines on said first panel, the lines in a fourth of said rows being parallel to each other and inclined in a direction opposite to the direction of inclination of the lines in said second row, the lines in said fourth row having the same pitch as the lines in said second row, said second and fourth rows extending horizontally, said first and third rows extending vertically, said rows being arranged in the form of a rectangle with said first and third rows extending between respective end portions of said second and fourth rows, the end portions of said first and third rows being adjacent to and adjoining the respective end portions of said second and fourth rows along junction lines extending diagonally with respect to said rectangle, each of the lines in the end portions of each of said rows being in alignment with and merging with a respective one of the lines of the adjacent end portion of another of said rows, whereby the moires formed in said end portions extend continuously and integrally across said junction line from one row to the rows adjacent thereto.

6. A display sign comprising a pair of mutually spaced parallel panels, one of said panels having a first series of spaced parallel lines over a substantial area thereof, the other of said panels having a second series of spaced parallel lines, a first of said panels being located between the second panel and a point of observation of said sign, said first panel having transparent spaces between said lines thereof to permit light rays from said second panel to be transmitted through said transparent spaces to said point of observation, the optical projections of said lines of said second panel to said point of observation intersecting said lines on said first panel to provide a plurality of dark moires in spaced relation to each other, said second series of parallel lines being arranged in a plurality of contiguous groups extending in side-by-side relation, said lines of each of said groups being offset with respect to said lines of said groups adjacent thereto by a predetermined amount proportional to the center to center distance between adjacent said lines of the same said group to produce moires in each of said groups proportionately offset with respect to said moires of each of said adjacent groups, said moires being proportionately offset two times the said proportional offset of said lines for all said line offsets up to fifty percent, said moires being proportionately offset two times the amount by which said proportional offset of said lines exceeds a whole multiple of fifty percent.

References Cited in the file of this patent

UNITED STATES PATENTS

| | | |
|---|---|---|
| 957,119 | Spiegel | May 3, 1910 |
| 1,430,314 | Morley | Sept. 26, 1922 |
| 2,061,309 | King | Nov. 17, 1936 |
| 2,482,947 | Swarbrick | Sept. 27, 1949 |
| 2,624,142 | Sayre | Jan. 6, 1953 |

UNITED STATES PATENT OFFICE

CERTIFICATE OF CORRECTION

Patent No. 2,917,854                         December 22, 1959

John Swarbrick

It is hereby certified that error appears in the printed specification of the above numbered patent requiring correction and that the said Letters Patent should read as corrected below.

In the grant, upper right-hand corner, for the patent number "2,817,854" read -- 2,917,854 --; in the printed specification column 4, line 28, for "multiplied 3/7" read -- multiplied by 3/7; column 7, line 15, for "up" read -- upon --.

Signed and sealed this 5th day of July 1960.

(SEAL)

Attest:

KARL H. AXLINE                                    ROBERT C. WATSON
Attesting Officer                                Commissioner of Patents